United States Patent

Takahashi

[11] Patent Number: 5,951,121
[45] Date of Patent: Sep. 14, 1999

[54] DEVICE FOR DETECTING OPERATION OF BRAKE PEDAL

[75] Inventor: Kimio Takahashi, Saitama, Japan

[73] Assignee: Akebono Brake Industry Co., Ltd., Tokyo, Japan

[21] Appl. No.: 09/083,082

[22] Filed: May 22, 1998

[30] Foreign Application Priority Data

May 27, 1997 [JP] Japan ................................ 9-137055

[51] Int. Cl.⁶ ........................................................ B60T 8/42
[52] U.S. Cl. ................. 303/155; 303/115.1; 303/DIG. 2; 303/DIG. 3
[58] Field of Search .............................. 303/113.1, 113.4, 303/115.1, 115.4, 116.1, 116.2, DIG. 1, DIG. 2, 155, DIG. 3; 60/534, 562; 188/355, 358, 359

[56] References Cited

U.S. PATENT DOCUMENTS

| | | | |
|---|---|---|---|
| 3,969,898 | 7/1976 | Fulmer et al. | 60/534 |
| 4,526,003 | 7/1985 | Leiber | 60/534 |
| 4,798,422 | 1/1989 | Becker | 303/115.4 |
| 5,567,021 | 10/1996 | Gaillard | 303/3 |
| 5,758,930 | 6/1998 | Schiel et al. | 303/113.4 |

FOREIGN PATENT DOCUMENTS 6-68303  8/1994  Japan .

*Primary Examiner*—Chris Schwartz
*Attorney, Agent, or Firm*—Morgan, Lewis & Bockius LLP

[57] ABSTRACT

A device for detecting operation of a brake pedal comprises: a first hydraulic chamber 9 in which fluid is pressurized by a first piston 7 connected with a brake pedal 1 when the brake pedal 1 is pushed downward; a second hydraulic chamber 13 communicated with the first hydraulic chamber 9 via an orifice 11 of small diameter; a first hydraulic pressure sensor 19 for detecting hydraulic pressure in the first hydraulic chamber; and a second hydraulic pressure sensor 20 for detecting hydraulic pressure in the second hydraulic chamber. The control unit 24 controls a motor (braking device) 22 in accordance with a difference ΔP in pressure obtained by the values of detection conducted by the first hydraulic pressure sensor 19 and the second hydraulic pressure sensor 20.

4 Claims, 5 Drawing Sheets

DEVICE FOR DETECTING OPERATION OF BRAKE PEDAL

BACKGROUND OF THE INVENTION

The present invention relates to a device for detecting operation of a brake pedal by which a condition of operation of the brake pedal conducted by a driver is detected and a predetermined control signal is outputted to the brake device of a vehicle so that the brake device can be operated in accordance with the demand of a driver.

In the automobiles manufactured recently, intelligence of the brake system is enhanced, for example, the anti-lock brake system and the traction control system are actively installed in the brake system.

When intelligence of the brake system is enhanced as described above, in order to operate the brake system in accordance with the demand of a driver, automobile engineers have been actively making a study of a detector for detecting operation of a brake pedal by which a condition of operation of the brake pedal conducted by a driver is detected and a predetermined control signal is outputted to the brake device.

For example, a device for detecting operation of a brake pedal shown in FIG. 5 is conventionally known, which includes a pushing force sensor 2 to detect a pushing force given by a driver, arranged in a tread portion 1a of the brake pedal 1.

Usually, the brake pedal 1 is elastically supported by a pedal biasing spring 3 so that a predetermined operating reaction force (brake feeling) can be obtained when a driver puts on the brake and also the brake pedal 1 can be quickly returned to the initial position when the driver's foot is separated from the brake pedal 1.

The above pushing force sensor 2 outputs an electric signal in accordance with the pushing force given by a driver.

When the brake is suddenly put on by the driver, an intensity of pushing force given to the pushing force sensor 2 is sharply increased as shown by curve A in FIG. 6. However, when the brake is gently put on by the driver, an intensity of pushing force given to the pushing force sensor 2 is gently increased as shown by curve B in FIG. 6.

Accordingly, as shown in FIG. 7, when an electric signal outputted from the pushing force sensor 2 is differentiated so that a rate of increase in the intensity of pushing force is found, that is, when inclinations of curves A and B are found, it is possible to discriminate whether it is a sudden braking operation or a gentle braking operation. When operation of the brake device is controlled in accordance with the result of discrimination, it is possible to realize the braking operation demanded by the driver.

In this connection, in FIG. 7, curve C corresponds to curve A in the case of a sudden braking operation in FIG. 6, and curve D corresponds to curve B in the case of a gentle braking operation in FIG. 6.

However, as shown on curve A in FIG. 6, minute noises n are added to an amplitude of the output signal of the pushing force sensor 2. When this output signal of the pushing force sensor 2 is differentiated, noises n are amplified as shown in FIG. 7. For the above reasons, there is a possibility that judgment of the operating condition of the brake pedal 1 is affected by the noises, for example, there is a possibility that judgment of whether or not it is a sudden braking operation is affected by the noises.

If filtering treatment is conducted on the electric signal so as to solve the above problems, judgment of the operating condition of the brake pedal 1 can be conducted more accurately. However, when filtering treatment is added to the controlling process, it takes time. As a result, a time delay is caused in the controlling time.

SUMMARY OF THE INVENTION

The present invention has been accomplished in view of the above circumstances. It is an object of the present invention to provide a device for detecting operation of a brake pedal by which the operating condition of the brake pedal can be accurately judged without conducting filtering treatment to remove noises, so that a time delay can be reduced and a brake force required by a driver can be quickly realized.

In order to accomplish the above object, the present invention is to provide a device for detecting operation of a brake pedal comprising: a first hydraulic chamber in which fluid is pressurized by a first piston connected with a brake pedal when the brake pedal is pushed downward; a second hydraulic chamber communicated with the first hydraulic chamber via an orifice; a pedal biasing spring for pressurizing fluid in the second hydraulic chamber by a second piston so as to give a force to the second piston, which resists hydraulic pressure in the first and the second hydraulic chamber; a first hydraulic pressure sensor for detecting hydraulic pressure in the first hydraulic chamber; a second hydraulic pressure sensor for detecting hydraulic pressure in the second hydraulic chamber; and a control unit for outputting a control signal to control a braking device in accordance with a difference in pressure obtained by the values of detection conducted by the first and the second hydraulic pressure sensor.

Also, the present invention is to provide a device for detecting operation of a brake pedal, further comprising a one-way valve including: a valve housing in which a communicating passage for communicating the first hydraulic chamber with the second hydraulic chamber is formed and a valve seat is formed so as to throttle a diameter of the communicating passage; and a valve body capable of sliding in the communicating passage in the valve housing, wherein the orifice is formed in the valve body in such a manner that the orifice penetrates the valve body, the valve body is settled on the valve seat by the hydraulic pressure of the first hydraulic chamber when a pressurizing motion is conducted by the first piston, and the valve body is separated from the valve seat when a depressurizing motion is conducted by the first piston so that the throttle of the communicating passage is released.

According to the above structure, in the case of a gentle braking operation in which the brake pedal is gently pushed downward, the first hydraulic chamber is gently pressurized by the first piston. Therefore, brake fluid pressurized in the first hydraulic chamber flows into the second hydraulic chamber via the orifice. Accordingly, a difference in pressure is seldom caused between both hydraulic chambers.

On the other hand, in the case of a sudden braking operation in which the brake pedal is suddenly pushed downward, brake fluid in the first hydraulic chamber is suddenly pressurized by the first piston. Therefore, a sufficiently large volume of brake fluid can not flow into the second hydraulic chamber through the orifice. Accordingly, hydraulic pressure in the second hydraulic chamber is increased only a little, however, hydraulic pressure in the first hydraulic chamber is greatly increased. As a result, a large difference in pressure is caused between both hydraulic chambers.

As described above, a difference in pressure between the first and the second hydraulic chamber is a piece of information to accurately express a condition of operation of the brake pedal conducted by a driver. When a difference in pressure between the first and the second hydraulic chamber is detected in accordance with the result of detection conducted by the first and the second hydraulic pressure sensor, it is possible to judge a braking motion demanded by the driver.

When a one-way valve is arranged between the first and the second hydraulic chamber and an orifice is provided in a valve body of the one-way valve, the first and the second hydraulic chamber can be communicated with each other through a communicating passage, the diameter of which is larger than that of the orifice, when the brake pedal is released. Due to the above arrangement, hydraulic fluid which has flowed from the first hydraulic chamber into the second hydraulic chamber can be quickly returned to the first hydraulic chamber. Therefore, it becomes possible to return the brake pedal to the initial position quickly.

DETAILED DESCRIPTION OF THE PREFERRED EMBODIMENTS

Referring to the accompanying drawings, a preferred embodiment of the device for detecting operation of a brake pedal of the present invention will be explained in detail as follows.

Figure 1:
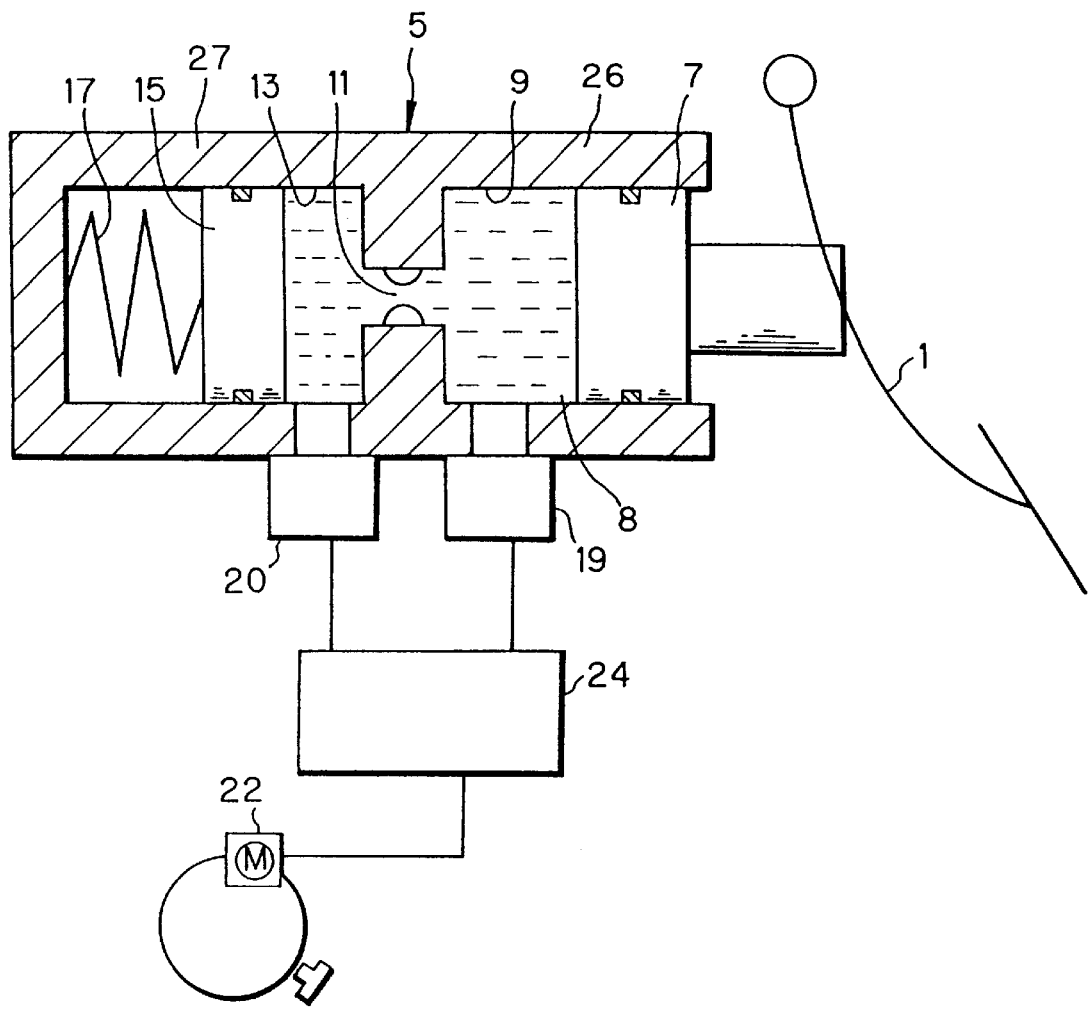
FIG. 1 is an arrangement view showing an outline of the first embodiment of the device for detecting operation of a brake pedal of the present invention.

FIG. 1 is a view showing the first embodiment of the device for detecting operation of a brake pedal of the present invention.

The device for detecting operation of a brake pedal of this embodiment includes: a first hydraulic chamber 9 in which brake fluid 8 is pressurized by the first piston 7 connected with the brake pedal 1 when the brake pedal 1 is pushed downward; a second hydraulic chamber 13 communicated with the first hydraulic chamber 9 via the orifice 11 of small diameter; a pedal biasing spring 17 for pressurizing brake fluid in the second hydraulic chamber 13 via the second piston 15, so that a predetermined reaction force can be given to the brake pedal 1 via brake fluid in the first hydraulic chamber 9 and the second hydraulic chamber 13 and also via the first piston; a first hydraulic pressure sensor 19 to detect hydraulic pressure in the first hydraulic chamber 9; a second hydraulic pressure sensor 20 to detect hydraulic pressure in the second hydraulic chamber 13; and a control unit 24 for detecting a difference $\Delta P$ in pressure between the first hydraulic chamber 9 and the second hydraulic chamber 13 according to the detection of the first hydraulic pressure sensor 19 and the second hydraulic pressure sensor 20 and also for outputting a control signal to control the motor 22 used for driving an electric type disc brake in accordance with the difference $\Delta P$ in pressure detected in the manner described above.

The conventional electric type disc brake itself is well-known by, for example, a Japanese Examined Patent Publication No. Hei. 6-68303.

The first hydraulic chamber 9 is formed by the first cylinder 26 and the first piston 7 which is slidably accommodated in the first cylinder 26. The second hydraulic chamber 13 is formed by the second cylinder 27 and the second piston 15 which is slidably accommodated in the second cylinder 27.

There is formed a closed circuit, in which brake fluid 8 is enclosed, by the first hydraulic chamber 9, second hydraulic chamber 13 and orifice 11 which communicates the first hydraulic chamber with the second hydraulic chamber.

In the device 5 for detecting operation of a brake pedal described above, in the case of a gentle braking operation in which the brake pedal 1 is gently pushed downward, the first piston 7 gently pressurizes brake fluid in the first hydraulic chamber 9. Therefore, brake fluid 8 pressurized in the first hydraulic chamber 9 flows into the second hydraulic chamber 13 via the orifice 11. Accordingly, hydraulic pressures in both hydraulic chambers are increased in the same manner. For the above reasons, difference $\Delta P$ in hydraulic pressure between both hydraulic chambers is small.

On the other hand, in the case of a sudden braking operation in which the brake pedal 1 is suddenly pushed downward, brake fluid 8 in the first hydraulic pressure 9 is quickly pressurized. Therefore, a sufficient volume of brake fluid 8 can not flow into the second hydraulic chamber 13 through the orifice 11. Consequently, hydraulic pressure in the second hydraulic chamber 13 is increased only a little, however, hydraulic pressure in the first hydraulic chamber 9 is greatly increased. As a result, a large difference $\Delta P$ in pressure is generated between both hydraulic chambers.

Figure 2:
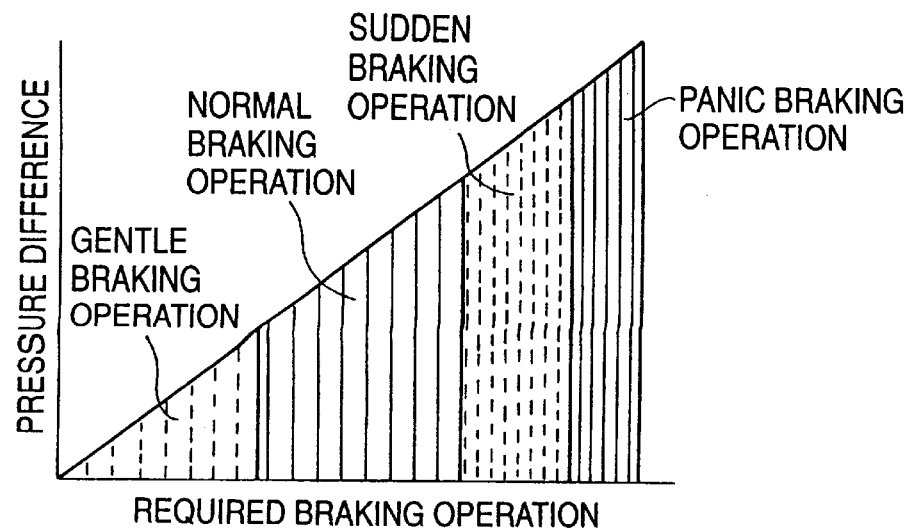
FIG. 2 is a correlation diagram showing a correlation between the detected pressure difference and the braking motion demanded by a driver in the device for detecting operation of a brake pedal of the first embodiment of the present invention.

As described above, a difference $\Delta P$ in pressure between the first hydraulic chamber 9 and the second hydraulic chamber 13 is a piece of information to accurately express a condition of operation of the brake pedal 1 conducted by a driver. As shown in FIG. 2, difference $\Delta P$ in pressure is increased in the order of a gentle braking operation, normal braking operation, sudden braking operation and panic braking operation. When a difference $\Delta P$ in pressure between the first hydraulic chamber 19 and the second hydraulic chamber 20 is detected in accordance with the result of detection conducted by the first hydraulic pressure sensor 19 and the second hydraulic pressure sensor 20, it is possible to judge the braking motion demanded by a driver.

In this case, a difference in pressure detected by the first hydraulic pressure sensor 19 and the second hydraulic pressure sensor 20 may be simply calculated, and it is unnecessary to conduct differentiation. Therefore, no noises are amplified when the driver operates the brake pedal 1.

Figure 3:
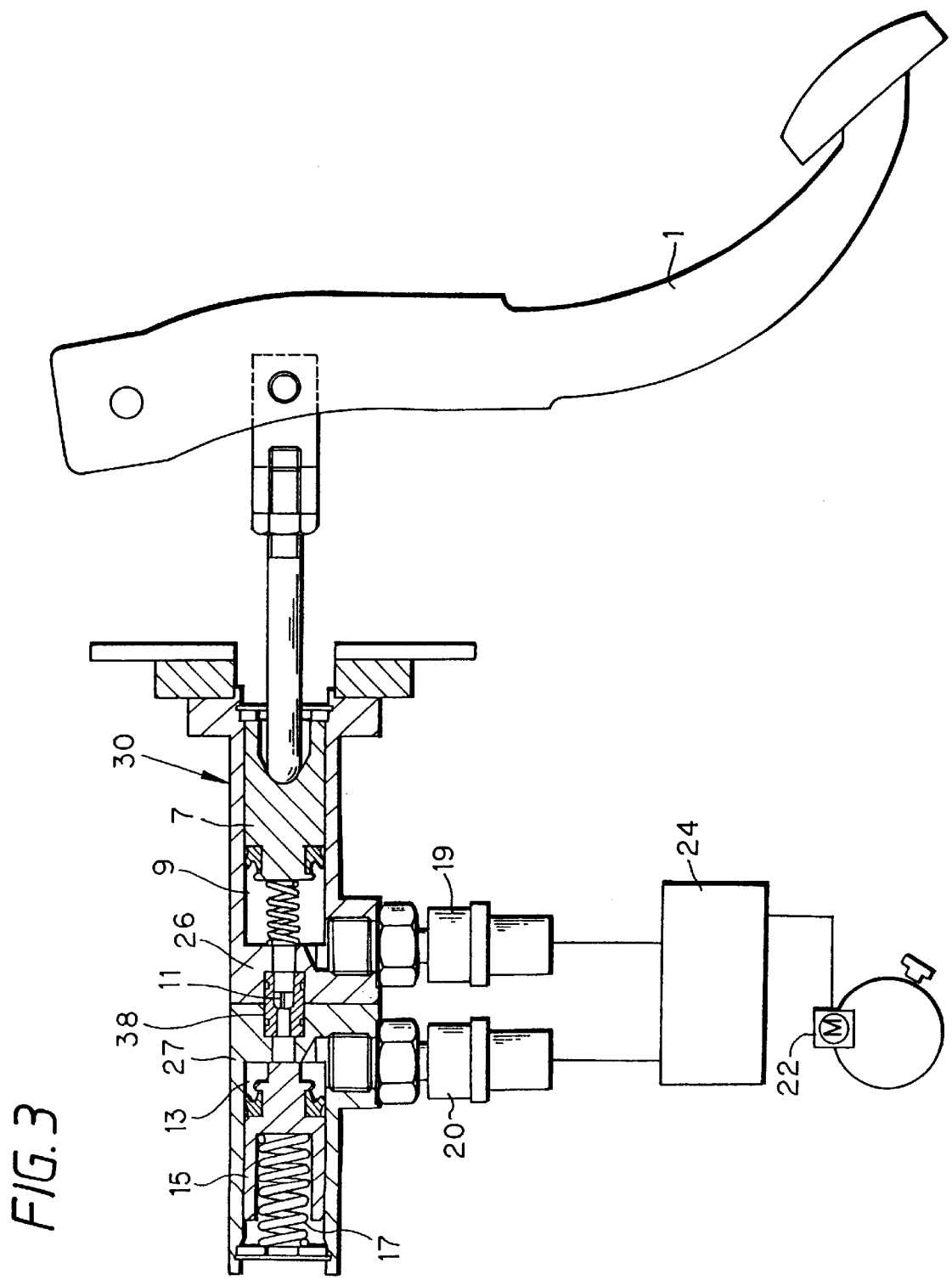
FIG. 3 is a cross-sectional view showing the arrangement of the device for detecting operation of a brake pedal of the second embodiment of the present invention.
Figure 4:
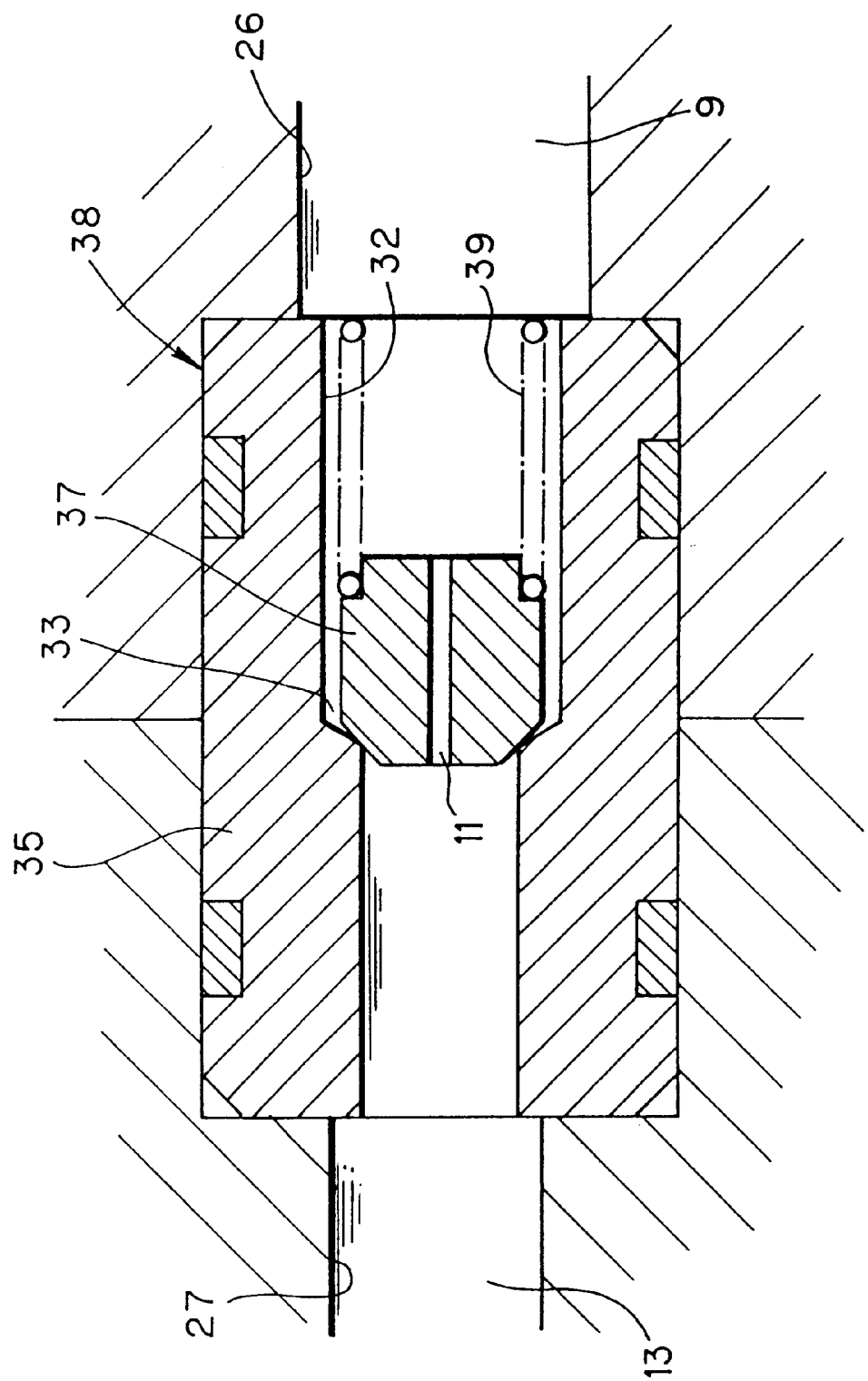
FIG. 4 is an enlarged view showing a primary portion of the device for detecting operation of a brake pedal shown in FIG. 3.
Figure 5:
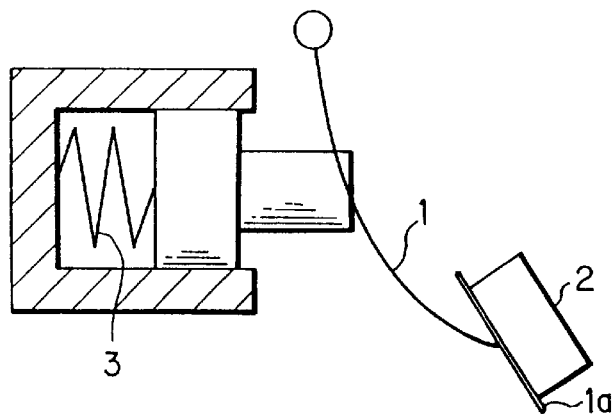
FIG. 5 is an arrangement view showing an outline of the conventional device for detecting operation of a brake pedal.
Figure 6:
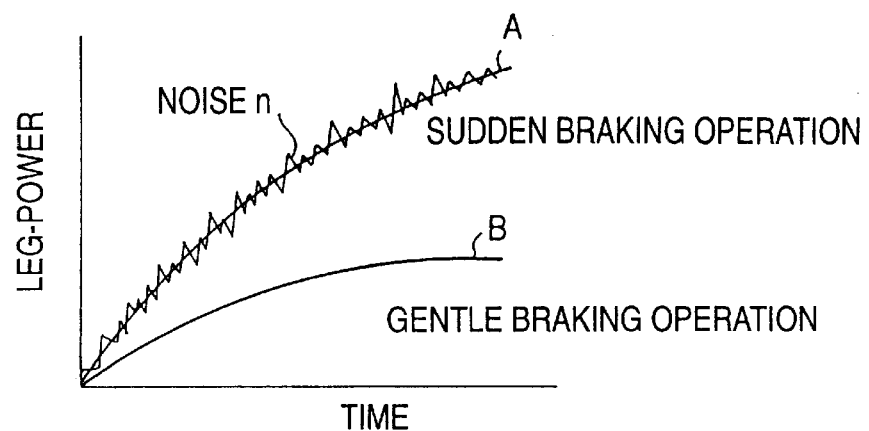
FIG. 6 is a characteristic diagram showing a difference in the intensity of pushing force between the case of sudden braking operation and the case of gentle braking operation.
Figure 7:
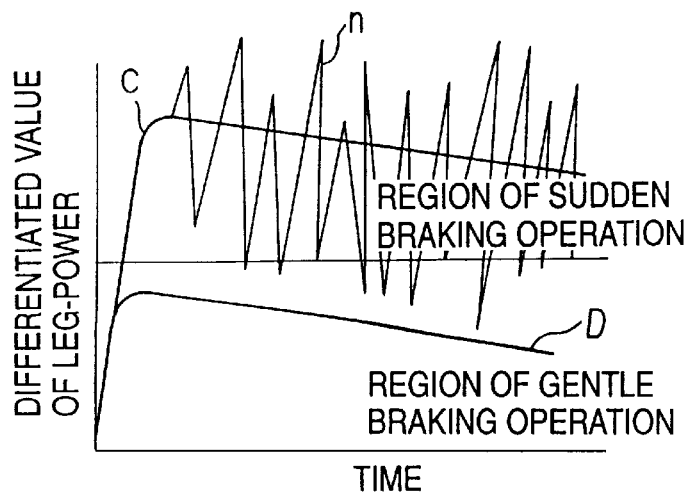
FIG. 7 is a characteristic diagram for explaining the differentiated values of pushing force shown in FIG. 6.

FIGS. 3 and 4 are views showing the second embodiment of the device for detecting operation of a brake pedal according to the present invention. FIG. 3 is a cross-sectional view showing an arrangement of the device for detecting operation of a brake pedal of the second embodiment, and FIG. 4 is an enlarged view of the primary portion of the device for detecting operation of a brake pedal shown in FIG. 3.

In this device 30 for detecting operation of a brake pedal, an arrangement of the orifice 11 in the first embodiment of the device 5 for detecting operation of a brake pedal is improved. Other points of the arrangement are the same as those of the first embodiment. Like reference characters are used to indicate like parts in the first and the second embodiment, and the explanations are omitted here.

As shown in FIG. 4, this device 30 for detecting operation of a brake pedal of the second embodiment includes: a communicating passage 32 to communicate the first hydraulic chamber 9 with the second hydraulic chamber 13; and a one-way valve 38 composed of a valve housing 35 provided with a valve seat 33 by which the communicating passage 32 is throttled, and a valve body 37 slidably accommodated in the communicating passage 32 formed in the valve housing 35.

The orifice 11 is formed in the valve body 37 in such a manner that the orifice penetrates the valve body, the valve body 37 is settled on the valve seat 33 by the hydraulic pressure of the first hydraulic chamber 9 when a pressurizing motion is conducted by the first piston 7 so that the communicating passage 32 is throttled to a diameter of the orifice 11, and the valve body 37 is separated from the valve seat 33 when a depressurizing motion is conducted by the first piston 7, so that the throttle of the communicating passage 32 is released.

In this connection, the valve body 37 is always biased by the valve body biasing spring 39 toward the valve seat 33 so that the valve body 37 can be kept seated on the valve seat 33.

A biasing force of this valve body biasing spring 39 is determined to be an appropriate value so that the valve body 37 can be quickly separated from the valve seat 33 so as to open the passage by hydraulic pressure of brake fluid returned from the second hydraulic chamber 13 to the first hydraulic chamber 9 when the driver releases the brake pedal 1 and hydraulic fluid is returned from the second hydraulic chamber 13 to the first hydraulic chamber 9 by the action of the second piston 15 to which a force is given by the pedal biasing spring 17.

In the device 30 for detecting operation of a brake pedal, when the driver releases the brake pedal 1, the first hydraulic pressure chamber 9 and the second hydraulic pressure chamber 13 are communicated with each other by the communicating passage 32, the diameter of which is larger than that of the orifice 11. Therefore, brake fluid, which has previously flowed from the first hydraulic chamber 9 into the second hydraulic chamber 13, can be quickly returned into the first hydraulic chamber 9, so that the brake pedal 1 can be quickly returned to the initial position. In this way, the operating property of the brake pedal 1 can be enhanced.

Figure 8:
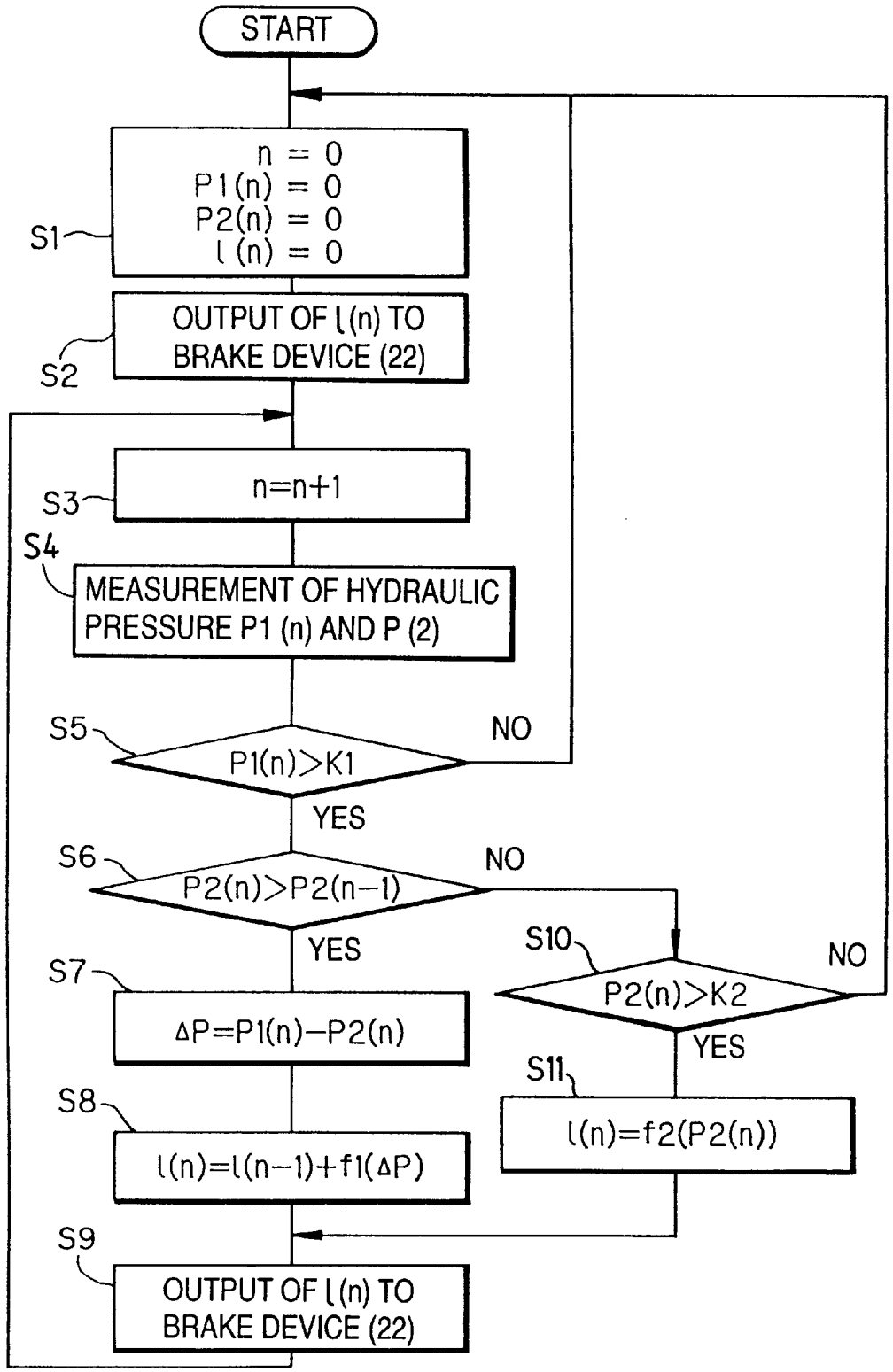
FIG. 8 is a flow chart of the control program to control the device for detecting operation of a brake pedal.

FIG. 8 is a flow chart of the control program.

In step S1, variables n, P1(n), P2(n) and 1(n) are initialized. In step S2, control current 1(n), which has been initialized, is sent to the motor 22 of the brake device. In step S3, 1 is added to the counter variable n. In step S4, hydraulic pressures P1(n), P2(n) in the first hydraulic chamber 9 and the second hydraulic chamber 13 are measured by the first hydraulic pressure sensor 19 and the second hydraulic pressure sensor 20. In step S5, hydraulic pressure P1(n) in the first hydraulic chamber 9 is compared with threshold value k1, and in the case of "No", the program is returned to step S1, and in the case of "Yes", it is judged that the driver starts putting on the brake, and the program proceeds to step S6. In step S6, hydraulic pressure P2(n−1) in the second hydraulic chamber 13, which was measured last time, and hydraulic pressure P2(n), which is measured this time, are compared with each other. In the case of P2(n) >P2(n−1), it is judged that the driver is putting on the brake, and the program proceeds to step S7. In step S7, difference ΔP in pressure between hydraulic pressure P1(n) in the first hydraulic chamber 9 and hydraulic pressure P2(n) in the second hydraulic chamber 13 is calculated. In step S8, a corrected current f1(ΔP) proportional to pressure difference ΔP is added to control current 1(n−1) of the last time, so that control current 1(n) of this time is calculated. In step S9, control current 1(n) is outputted to the motor 22 of the brake device, and a brake force proportional to control current 1(n) is generated. After that, the program returns to step S3, and a corrected current f1(ΔP) proportional to pressure difference ΔP is found. In this way, control of high response property can be performed from a region of gentle braking operation to a region of panic braking operation. In this connection, when hydraulic pressure P2(n) of the second hydraulic chamber 13 of this time becomes lower than hydraulic pressure P2(n−1) of the last time, it is judged that the driver is returning the brake pedal. Therefore, it is judged to be "No" in step S6, and the program proceeds to step S10. In step S10, hydraulic pressure P2(n) in the second hydraulic chamber 13 is compared with the threshold value k2. When hydraulic pressure P2(n) in the second hydraulic chamber 13 is higher than the threshold value k2, control current f2(P2 (n)) proportional to hydraulic pressure P2(n) is calculated in step S11, and it is outputted to the brake device in step S9. When it is judged to be "No" in step S10, it is assumed that the brake pedal has been completely returned, and the program returns to step S1.

According to the device for detecting operation of a brake pedal of the present invention, in the case of a gentle braking operation in which the brake pedal is gently pushed downward, brake fluid in the first hydraulic chamber is gently pressurized by the first piston. Therefore, brake fluid pressurized in the first hydraulic chamber flows into the second hydraulic chamber via the orifice, so that a pressure difference is seldom caused between both hydraulic chambers. On the other hand, in the case of a sudden braking operation in which the brake pedal is suddenly pushed downward, brake fluid is suddenly pressurized by the first piston in the first hydraulic chamber. Therefore, a sufficiently large volume of brake fluid can not flow into the second hydraulic chamber via the orifice. Accordingly, hydraulic pressure is increased only a little in the second hydraulic chamber, however, hydraulic pressure in the first hydraulic chamber is greatly increased. As a result, a large difference in pressure is generated between both hydraulic chambers.

That is, a difference in pressure between the first hydraulic chamber and the second hydraulic chamber is a piece of information to accurately express a condition of operation of the brake pedal conducted by a driver. When a difference in pressure between the first hydraulic chamber and the second hydraulic chamber is detected in accordance with the result of detection conducted by the first hydraulic pressure sensor and the second hydraulic pressure sensor, it is possible to judge a braking motion demanded by the driver.

In this case, a difference in pressure detected by the first hydraulic pressure sensor and the second hydraulic pressure sensor may be simply calculated, and it is unnecessary to conduct differentiation. Therefore, no noises are amplified when the driver operates the brake pedal. That is, it is unnecessary to conduct a filtering treatment for removing noise caused when the driver operates the brake pedal. Accordingly, the operating condition of the brake pedal can be accurately and quickly judged.

Consequently, a time delay can be decreased and the braking operation demanded by the driver can be quickly realized.

When a one-way valve is arranged between the first and the second hydraulic chamber and an orifice is provided in the valve body of the one-way valve, the first and the second hydraulic chamber can be communicated with each other through a communicating passage, the diameter of which is larger than that of the orifice, when the brake pedal is released. Due to the above arrangement, hydraulic fluid which has flowed from the first hydraulic chamber into the second hydraulic chamber can be quickly returned. Therefore, it becomes possible to return the brake pedal to the initial position quickly. Accordingly, the property of operating the brake pedal can be enhanced.

It is possible to apply the present invention to not only the above electric type brake device but also a brake system in which an amount of operation of the brake pedal or a force of operation of the brake pedal is converted into an electric signal, and pressure of a pressure source is controlled according to the electric signal. Alternatively, it is possible to apply the present invention to a brake device in which a piezoelectric element is used as an actuator.

What is claimed is:

1. A device for detecting operation of a brake pedal comprising:

a first hydraulic chamber in which fluid is pressurized by a first piston connected with a brake pedal when the brake pedal is pushed downward;

a second hydraulic chamber communicated with the first hydraulic chamber via an orifice;

a pedal biasing spring for pressurizing fluid in the second hydraulic chamber through a second piston so as to give a force to said second piston, which resists hydraulic pressure in the first and the second hydraulic chambers;

a first hydraulic pressure sensor for detecting hydraulic pressure in the first hydraulic chamber;

a second hydraulic pressure sensor for detecting hydraulic pressure in the second hydraulic chamber;

a control unit for outputting a control signal to control a braking device in accordance with a difference in pressure obtained by the values of detection conducted by the first and the second hydraulic pressure sensors.

2. The device for detecting operation of a brake pedal according to claim 1, further including a one-way valve comprising:

a valve housing in which a communicating passage for communicating the first hydraulic chamber with the second hydraulic chamber is formed and a valve seat is formed so as to throttle a diameter of the communicating passage; and a valve body capable of sliding in the communicating passage in the valve housing, wherein the orifice is formed in the valve body in such a manner that the orifice penetrates the valve body, the valve body is settled on the valve seat by the hydraulic pressure of the first hydraulic chamber when a pressurizing motion is conducted by the first piston so that the communicating passage is throttled to a diameter of the orifice, and the valve body is separated from the valve seat when a depressurizing motion is conducted by the first piston so that the throttle of the communicating passage is released.

3. The device for detecting operation of a brake pedal according to claim 1, in which in said control unit said difference is compared with a predetermined threshold so as to judge an operation of the brake pedal.

4. The device for detecting operation of a brake pedal according to claim 2, in which in said control unit said difference is compared with a predetermined threshold so as to judge an operation of the brake pedal.

* * * * *